United States Patent
Fuchs

(10) Patent No.: US 9,383,099 B2
(45) Date of Patent: Jul. 5, 2016

(54) APPARATUS FOR MINIMIZING BYPASS IN AMMONIA OXIDATION BURNERS

(75) Inventor: Jürgen Fuchs, Dortmund (DE)

(73) Assignee: Thyssenkrupp Industrial Solutions Gmbh, Essen (DE)

( * ) Notice: Subject to any disclaimer, the term of this patent is extended or adjusted under 35 U.S.C. 154(b) by 312 days.

(21) Appl. No.: 14/343,845

(22) PCT Filed: Sep. 7, 2012

(86) PCT No.: PCT/EP2012/003764
§ 371 (c)(1),
(2), (4) Date: Jun. 3, 2014

(87) PCT Pub. No.: WO2013/034304
PCT Pub. Date: Mar. 14, 2013

(65) Prior Publication Data
US 2014/0353918 A1    Dec. 4, 2014

(30) Foreign Application Priority Data

Sep. 9, 2011 (DE) .......................... 10 2011 112 781

(51) Int. Cl.
*C01B 21/28* (2006.01)
*B01J 12/00* (2006.01)
(Continued)

(52) U.S. Cl.
CPC ................. *F23D 14/46* (2013.01); *B01J 8/008* (2013.01); *B01J 8/025* (2013.01); *B01J 12/007* (2013.01); *C01B 21/28* (2013.01); *B01J 2208/00884* (2013.01)

(58) Field of Classification Search
CPC .... C01B 21/26; C01B 21/265; C01B 21/267; C01B 21/28; B01J 15/005; B01J 19/305; B01J 19/325; B01J 12/007; B01J 2208/00884

USPC ........... 423/403–405; 422/221, 239, 310, 311
See application file for complete search history.

(56) References Cited

U.S. PATENT DOCUMENTS 2,088,929 A    8/1937   Scharff et al.
2,192,816 A *  3/1940   Laury .................... C01B 21/26
                                                    422/211
(Continued)

FOREIGN PATENT DOCUMENTS

DE        19633004 A1    2/1998
DE       102008059930    6/2010
(Continued)

OTHER PUBLICATIONS

Australian Patent examination report No. 1, AU Application No. 2012306723, date of issue Jun. 17, 2015, 2 pages.
(Continued)

*Primary Examiner* — Jennifer A Leung
(74) *Attorney, Agent, or Firm* — Brooks Kushman P.C.

(57) ABSTRACT

A sealing system of a burner basket in an ammonia oxidation burner, wherein the burner basket has a wall that is anchored in the ammonia oxidation burner and the burner basket has a gas-permeable bottom plate, which is placed on further internal fittings of the ammonia oxidation burner and has a peripheral rim, wherein the wall and the gas-permeable bottom plate are not mechanically connected to each other, and so there is a gap between the wall and the peripheral rim of the bottom plate, wherein at the peripheral rim of the bottom plate a rim seal that is made up of individual segments is mounted movably by way of guiding pins and the rim seal projects over the gap between the peripheral rim of the bottom plate to the wall and lies against the wall.

17 Claims, 1 Drawing Sheet

Figure 1A:
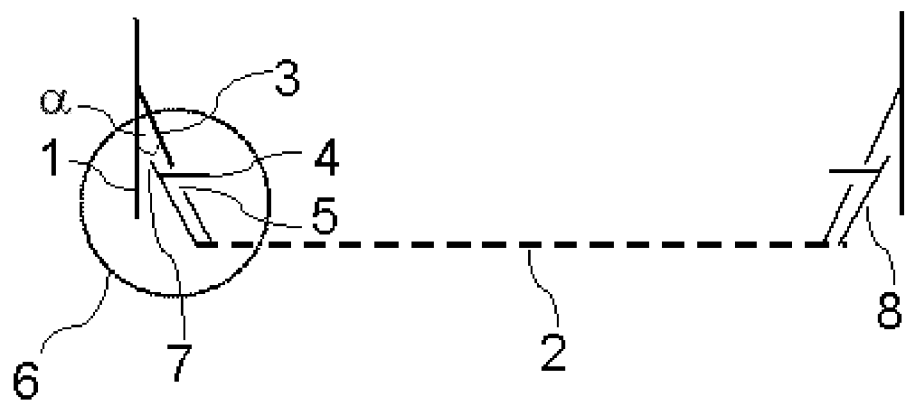

(51) Int. Cl.
  *F23D 14/46* (2006.01)
  *B01J 8/00* (2006.01)
  *B01J 8/02* (2006.01)

(56) References Cited

U.S. PATENT DOCUMENTS

| | | | | |
|---|---|---|---|---|
| 3,660,024 | A | * | 5/1972 | Gillespie ............... B01J 35/06 422/211 |
| 5,820,365 | A | | 10/1998 | Oppenberg et al. |
| 7,323,152 | B2 | * | 1/2008 | Axon ............... B01D 53/0423 422/211 |
| 9,242,216 | B2 | * | 1/2016 | Fuchs ............... C01B 21/28 |

| | | | |
|---|---|---|---|
| 2004/0234433 | A1 | 11/2004 | Axon et al. |
| 2006/0110302 | A1 | 5/2006 | Oien et al. |
| 2012/0034148 | A1 | 2/2012 | Schwefer et al. |

FOREIGN PATENT DOCUMENTS

| | | |
|---|---|---|
| WO | 0040329 | 7/2000 |
| WO | 03000400 | 1/2003 |

OTHER PUBLICATIONS

International Search Report for PCT/EP2012/003764, English translation attached to original, Both completed by the European Patent Office on Jan. 3, 2013, 5 Pages.

\* cited by examiner

APPARATUS FOR MINIMIZING BYPASS IN AMMONIA OXIDATION BURNERS

CROSS-REFERENCE TO RELATED APPLICATION

This application is the U.S. national phase of PCT Application No. PCT/EP2012/003764 filed on Sep. 7, 2012, which claims priority to German Patent Application No. 10 2011 112 781.3 filed on Sep. 9, 2011, the disclosures of which are incorporated in their entirety by reference herein.

The invention relates to a sealing system of a burner basket in an ammonia oxidation burner and a method of sealing a burner basket in an ammonia oxidation burner.

Nitric acid is produced by reaction of $NO_2$ with water and oxygen (air), giving $NO_2$ by oxidation of NO. Here, the NO required is usually prepared by oxidation of $NH_3$ in an ammonia oxidation burner.

Use is made of, for example, platinum/rhodium gauzes as catalysts. These are used in the burner possibly in combination with scavenger systems and placed on support materials located in a burner basket. These support materials are usually Raschig or Pall rings, Berl, Interlox or Torus saddles and/or Interpack bodies having dimensions of about 5-200 mm. These consist of stoneware, porcelain, glass, catalyst materials or stainless steel and rest on support structures which can be configured as, for example, perforated plates whose free cross section is at least equal to or greater than the relative gap volume of the packing elements. These support structures form a gas-permeable bottom plate of the burner basket. Further support meshes for the support materials are usually provided on the support structures. The catalyst gauzes are likewise usually fastened together with further support meshes in the burner basket by means of clamping devices in order to avoid slipping.

The support structures are frequently positioned loosely on further internals located in the ammonia oxidation burner, so that there is no mechanical connection between the outer wall of the burner basket and the support structures. Such further internals are usually present because a combination of $NH_3$ combustion elements and La Mont waste heat boilers are frequently employed in practice. This is advantageous since decomposition of the NO formed has to be avoided and rapid cooling of the gas mixture produced therefore has to be achieved. Thus, tube coils for cooling the gas mixture are usually located below the burner basket in the ammonia oxidation burner and the support structures can be flexibly mounted on these.

The reaction temperature in the reaction of ammonia with air to form nitrogen oxide and water vapor is up to 950° C. and pressures of up to 10 bar are employed. This leads to the burner basket expanding correspondingly. This expansion occurs at places which are covered with support materials, i.e., for example, on the gas-permeable bottom plate, with some time delay since the increasing temperature is delayed here. Thus, high wear occurs in the case of constructions of burner baskets which are made from one piece, i.e. in the case of which the outer wall is mechanically joined to the gas-permeable bottom plate, since the burner baskets are subjected to high heat stresses in the material, especially during start-up and shut-down. For this reason, attempts are made to avoid such constructions and the gas-permeable bottom plate is laid loosely on the existing constructions in the ammonia oxidation burner.

However, in the loose laying of the gas-permeable bottom plate on internals present in the reactor, a gap is formed between the circumferential wall of the burner basket and the gas-permeable bottom plate. This happens as soon as the wall of the burner basket and the gas-permeable bottom plate begin to expand to different degrees. This results in bypass of gas, so that the subsequent cooling in the La Mont waste heat boiler cannot take place immediately and there is a high probability of decomposition of the NO produced.

In addition, there is the risk of the support material for the catalyst gauzes falling through this gap and the support material thus no longer being able to perform its function of uniformly supporting the catalyst gauzes. The bed structure of the support material is destroyed thereby and crack and cavity formation in the bed occurs. It is known that such phenomenon are associated with a loss of combustion efficiency and bypass of ammonia. From environmental points of view, bypass of ammonia has to be avoided at all costs and a reduction in the combustion efficiency also affects the efficiency of the overall process, so that in the end less nitric acid is produced.

There is therefore a need to optimize the existing burner baskets further in order to avoid the abovementioned problems in ammonia oxidation burners.

It is therefore an object of the present invention to provide a sealing system of a burner basket in an ammonia oxidation burner, in which the wall and the gas-permeable bottom plate are not mechanically joined to one another, so that the disadvantages of the industrial variants used hitherto are minimized and bypass of gas is reduced. In addition, a loss of media present in the burner basket, e.g. Raschig rings, should be minimized. A seal between the gas-permeable bottom and the burner basket wall, which bridges the different thermal expansions in the radial and axial directions and exerts minimum forces on the wall and the bottom plate, should be achieved. A further object of the invention is to provide a corresponding method.

The object of the invention is achieved by a sealing system of a burner basket in an ammonia oxidation burner, where the burner basket has a wall (1) which is anchored in the ammonia oxidation burner and the burner basket has a gas-permeable bottom plate (2) which is placed on further internals of the ammonia oxidation burner and has a circumferential border (8) for accommodating further media and the wall (1) and the gas-permeable bottom plate (2) are not mechanically joined to one another, so that a gap (7) is present between the wall (1) and the circumferential border (8) of the bottom plate (2), and a border seal (3) which is made up of individual segments is moveably mounted by means of guide pins (4) at the circumferential border (8) of the bottom plate (2) and the border seal (3) projects over the gap (7) between the circumferential border (8) of the bottom plate (2) to the wall (1) and contacts the wall (1).

The border seal (3) here consists of a plurality of individual pieces (segments) which are moveably mounted by means of the guide pins (4) at the circumferential border (8) of the bottom plate (2). Here, the individual segments advantageously have a length of from 500 mm to 1200 mm. The segmented border seal is provided right around the burner basket and is, for example, configured as individual metal sheets. It is possible for the individual segments of the border seal (3) to overlap or be arranged directly adjacent to one another. Variable gap widths which form at different places in the burner basket of the ammonia oxidation burner can also be reliably sealed in this way.

The anchoring of the wall of the burner basket in the ammonia oxidation burner can be carried out by hanging the burner basket on appropriate devices in the ammonia oxidation burner or, for example, by attaching the wall of the burner basket to the ammonia oxidation burner by means of a flange connection. Furthermore, the wall of the burner basket can also be welded onto the ammonia oxidation burner. The ammonia oxidation burners have a diameter of from 1.5 m to 7 m.

The further internals can, as described above, be tube coils of a La Mont waste heat boiler which is likewise located in the ammonia oxidation burner. However, other internals of any type, for example further support structures, can be used for accommodating the gas-permeable bottom plate. Here, the bottom plate is not mechanically joined to the further internals, but rests loosely thereon.

For the purposes of the present invention, the further media which can be accommodated by the burner basket are, for example, support materials such as Raschig or Pall rings, Berl, Interlox or Torus saddles and/or Interpack bodies having dimensions of about 5-200 mm, which, by way of example, serve as catalyst materials.

For the purposes of the present invention, moveable mounting is the opposite of fixed, which has been effected, for example, by welding or a screw connection. That is to say, the moveable configuration of the border seal ensures that when the burner basket expands during operation, the border seal continues to contact the wall of the burner basket, i.e. loosely rests against the wall, and a seal is thus ensured. The border seal is thus mounted in a floating fashion, and thus moveably.

The border seal is advantageously arranged at an angle of from 2° to 60° and preferably from 15° to 30° relative to the wall of the burner basket.

In an embodiment of the invention, the border seal which is made up of individual segments is made of metal sheets. Here, the individual metal sheets which form the segments of the border seal are provided right around the burner basket.

In a preferred embodiment of the invention, the border seal is moveably mounted by means of guide pins which are provided at the outer circumferential border (8) of the bottom plate. This is advantageously achieved by the border seal having openings into which the guide pins project. The openings of the border seal can have any shape which allows vertical and/or horizontal movement of the border seal and ensures a seal between the gas-permeable bottom plate and the wall of the burner basket.

The gas-permeable bottom plate is preferably a honeycomb grating, a mesh plate, a sieve plate, a grid or a perforated plate. Particular preference is given to using a honeycomb grating since, on the basis of experience, this configuration of the bottom plate best copes with the conditions in an ammonia oxidation burner.

Furthermore, the present invention provides a method of sealing a burner basket in an ammonia oxidation burner against bypass of gas and loss of media present in the burner basket, where the burner basket has a wall (1) which is anchored in the ammonia oxidation burner and the burner basket has a gas-permeable bottom plate (2) which is placed on further internals of the ammonia oxidation burner and has a circumferential border (8) for accommodating further media and the wall (1) and the gas-permeable bottom plate (2) are not mechanically joined to one another, so that a border seal (3) which is made up of individual segments is moveably mounted by means of guide pins (4) between the wall (1) and the circumferential border (8) of the bottom plate (2) and the border seal (3) projects over the gap (7) between the circumferential border (8) of the bottom plate (2) to the wall (1) and contacts the wall (1) and the border seal (3) is at an angle to the wall (1) of from 2° to 60° and the angle to the wall is changed when the burner basket expands. The border seal (3) which is made up of individual segments here contacts the wall (1) and thus reliably seals the gap (7) over the entire operating range of the basket and the associated, different expansions.

In an embodiment of the method of the invention, the angle to the wall is increased when the burner basket expands. This occurs by, for example when the ammonia oxidation burner is started up, the wall of the burner basket and the gas-permeable bottom plate heat up at different rates by contact with media, for example Raschig rings, present in the burner basket and thus displaying different degrees of expansion. If the gas-permeable bottom plate heats up more slowly than the wall of the burner basket, then the gap between these two components becomes larger. In this case, the media present in the burner basket press the border seal downward and the angle to the wall is increased.

In a preferred embodiment of the method, the moveable mounting of the border seal (3) is achieved by means of guide pins which project into openings of the border seal (3) and are provided on the circumferential border (8) at the outer peripheral region of the bottom plate (2).

As border seal (3) which is made up of individual segments, preference is given to using metal sheets.

The present invention will be illustrated below with the aid of FIG. 1*a* and FIG. 1*b*.

FIG. 1*a* Schematic sketch of a burner basket with sealing system according to the invention in the cold state.

Figure 1B:
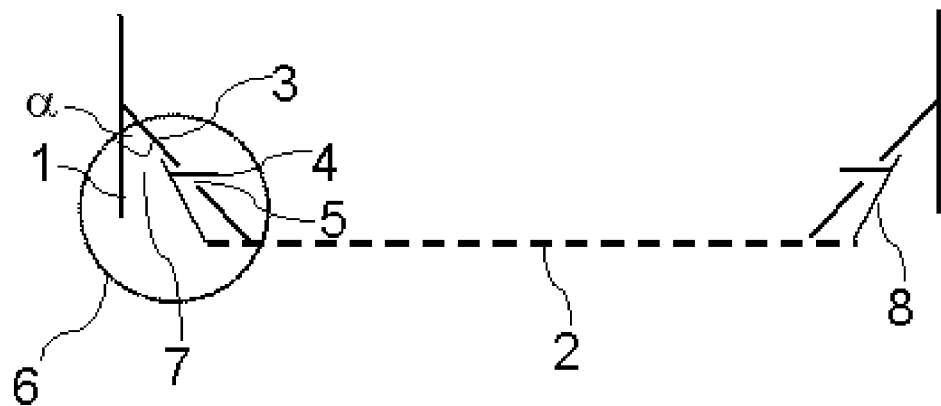

FIG. 1*b* Schematic sketch of a burner basket with sealing system according to the invention in a state in which a sealing effect is desirable.

FIG. 1*a* schematically shows a sealing system according to the invention in the cold state. A gas-permeable bottom plate 2 having a border 8 and a wall 1 which has a cylindrical shape are shown. The gas-permeable bottom plate 2 and the wall 1 are not mechanically joined to one another but are instead hung, fastened or loosely erected (not shown) on further internals of the ammonia oxidation burner. A moveable mounting of the border seal 3 by means of guide pins 4 in the outer peripheral region 6 of the gas-permeable bottom plate is shown by way of example in FIG. 1*a*. For this purpose, the border seal 3 has openings 5 which are loosely pushed over the guide pins 4 and project in the vertical direction through the bottom plate 2 and contact the wall 1. Here, the border seal 3 is arranged at an angle α of from 2° to 60° relative to the wall 1, as a result of which a sealing effect for gases and possibly support material for catalyst gauzes resting on the gas-permeable bottom plate 2 is achieved (not shown).

FIG. 1*b* shows the gas-permeable bottom plate in a virtually unchanged state compared to FIG. 1*a*. However, in FIG. 1*b*, the wall 1 of the burner basket is shown in the expanded state compared to FIG. 1*a*, so that the diameter of the wall of the burner basket has increased. This occurs, for example, during start-up of the ammonia oxidation burner when the temperature distribution in the burner is nonuniform due to internals or due to support material for catalyst gauzes located on the gas-permeable bottom plate 2 (not shown) and the individual components therefore expand to differing degrees. This inevitably leads to an enlargement of the gap 7 between the gas-permeable bottom plate 2 and the wall 1. The moveably mounted border seal 3 prevents the enlargement of the gap 7 from leading to bypass of gas or slipping through of support material for catalyst gauzes possibly located on the gas-permeable support plate 2 (not shown). Here, the angle a increases and the gap 7 is sealed according to the invention.

Advantages resulting from the invention are:
  Sealing against bypass of NO product gases, so that these can be subjected to cooling directly above the gas-permeable bottom plate and decomposition of the NO is largely prevented.

Sealing against support materials for catalyst gauzes located on the gas-permeable bottom plate. Retention of the bed structure of the support materials is ensured thereby and crack and cavity formation through which bypass of gas, e.g. ammonia, can likewise occur.

LIST OF REFERENCE NUMERALS:

1 Wall
2 Gas-permeable bottom plate
3 Border seal
4 Guide pin
5 Opening
6 Outer peripheral region of the gas-permeable bottom plate
7 Gap
8 Circumferential border of the bottom plate

The invention claimed is:

1. A sealing system of a burner basket in an ammonia oxidation burner, wherein the burner basket comprises:
a wall anchored in the ammonia oxidation burner, and
a gas-permeable bottom plate placed inside of the ammonia oxidation burner, the plate including a circumferential border for accommodating media,
wherein the wall and the gas-permeable bottom plate are not mechanically joined to one another, so that a gap is present between the wall and the circumferential border of the bottom plate, wherein a border seal including a plurality of individual segments is moveably mounted by a plurality of guide pins at the circumferential border of the bottom plate and the border seal projects over the gap between the circumferential border of the bottom plate to the wall and contacts the wall.

2. The sealing system of claim 1, wherein the border seal is arranged at an angle of from 2° to 60° relative to the wall.

3. The sealing system of claim 1, wherein the border seal comprises metal sheets.

4. The sealing system of claim 1, wherein the border seal has a plurality of openings into which the guide pins project.

5. The sealing system of claim 4, wherein an opening of the border seal has a shape which allows vertical and/or horizontal movement of the border seal.

6. The sealing system of claim 1, wherein the gas-permeable bottom plate is a honeycomb grating, a mesh plate, a sieve plate, a grid or a perforated plate.

7. The sealing system of claim 2, wherein the border seal is made from metal sheets.

8. The sealing system of claim 2, wherein the border seal has a plurality of openings into which the guide pins project.

9. The sealing system of claim 3, wherein the border seal has a plurality of openings into which the guide pins project.

10. The sealing system of claim 2, wherein the gas-permeable bottom plate is a honeycomb grating, a mesh plate, a sieve plate, a grid or a perforated plate.

11. The sealing system of claim 3, wherein the gas-permeable bottom plate is a honeycomb grating, a mesh plate, a sieve plate, a grid or a perforated plate.

12. The sealing system of claim 4, wherein the gas-permeable bottom plate is a honeycomb grating, a mesh plate, a sieve plate, a grid or a perforated plate.

13. The sealing system of claim 5, wherein the gas-permeable bottom plate is a honeycomb grating, a mesh plate, a sieve plate, a grid or a perforated plate.

14. A method of sealing a burner basket in an ammonia oxidation burner against bypass of gas and loss of media present in the burner basket, comprising:
providing a burner basket comprising a gas-permeable bottom plate placed on further internals of the ammonia oxidation burner, the plate having a circumferential border for accommodating media, and a wall anchored to the ammonia oxidation burner, wherein the wall and the gas-permeable bottom plate are not mechanically joined to one another so that a gap is present between the wall and the circumferential border of the bottom plate, and
moveably mounting a border seal comprising a plurality of individual segments on a plurality of guide pins at the circumferential border of the bottom plate, so that the border seal projects over the gap and contacts the wall, wherein the border seal is at an angle to the wall of from 2° to 60°, and the angle to the wall is changed when the burner basket expands or contracts relative to the wall.

15. The method of claim 14, wherein the angle to the wall is increased when the burner basket expands.

16. The method of claim 14, further comprising a step of using metal sheets as the border seal.

17. The method of claim 15, further comprising a step of using metal sheets as the border seal.

* * * * *